United States Patent [19]

Trimble et al.

[11] Patent Number: 5,686,924

[45] Date of Patent: Nov. 11, 1997

[54] LOCAL-AREA POSITION NAVIGATION SYSTEM WITH FIXED PSEUDOLITE REFERENCE TRANSMITTERS

[75] Inventors: Charles R. Trimble, Los Altos Hills; Arthur N. Woo, Cupertino, both of Calif.

[73] Assignee: Trimble Navigation Limited, Sunnyvale, Calif.

[21] Appl. No.: 453,261

[22] Filed: May 30, 1995

[51] Int. Cl.$^6$ ............................... H04B 7/185; G01S 5/02
[52] U.S. Cl. ............................................................ 342/357
[58] Field of Search .............................. 342/357; 364/449

[56] References Cited

U.S. PATENT DOCUMENTS

| | | |
|---|---|---|
| 5,347,536 | 9/1994 | Meehan . |
| 5,375,059 | 12/1994 | Kyrtsos et al. . |
| 5,390,124 | 2/1995 | Krytsos . |
| 5,390,125 | 2/1995 | Sennott et al. . |
| 5,402,450 | 3/1995 | Lennen . |
| 5,512,902 | 4/1996 | Guthrie et al. ........................ 342/357 |
| 5,555,503 | 9/1996 | Krytsos et al. ........................ 364/449 |
| 5,557,284 | 9/1996 | Hartman ................................. 342/357 |

*Primary Examiner*—Theodore M. Blum
*Attorney, Agent, or Firm*—Thomas E. Schatzel; Law Offices of Thomas E. Schatzel A Prof. Corporation

[57] ABSTRACT

Several fixed-location pseudolites transmit coordinates of their respective positions to a local area navigation receiver. The respective position and range information to each pseudolite are used to compute the position of the receiver. The pseudolites transmit on frequencies exempt from licensing requirements at power levels under one watt and use spread spectrum communication and pseudo random number codes similar to the global positioning system operated by the United States Government.

12 Claims, 3 Drawing Sheets

LOCAL-AREA POSITION NAVIGATION SYSTEM WITH FIXED PSEUDOLITE REFERENCE TRANSMITTERS

BACKGROUND OF THE INVENTION

1. Field of the Invention

The invention relates generally to navigation systems and more specifically to navigation receivers that operate with signals received from fixed-location pseudolites.

2. Description of the Prior Art

The global positioning system operated by the United States government uses microwave transmissions from orbiting satellites with known orbits. The transmissions are received by a satellite navigation receiver to determine the position of the receiver by triangulation. Such microwave frequencies are easily blocked by tree cover, building roofs or various other obstructions. Locating the receiver in a canyon or valley can also limit performance by excluding necessary satellites from a constellation being tracked.

As a result, some prior art GPS applications use pseudolites to augment the satellite constellation. Such pseudolites mimic the satellite transmissions, but are fixed on the ground and transmit the appropriate ephemeris data, e.g., in a "high-observable six" configuration where the four orbiting satellites being tracked are augmented by two additional "satellites". The signal reception is guaranteed since the pseudolites are located near the place where the receiver is used, and their ephemeris data is highly accurate because their transmitting positions are accurately surveyed-in. For example, a pair of pseudolites at the end of an airport's runway are conventionally used to enhance the position determination of a receiver located on board a landing airplane.

Centimeter-accurate, real-time kinematic GPS receivers are now available to make it possible to operate robotic and other control systems in confined areas, e.g. a construction yard or site. However, the operation of such receivers within a building is not possible with conventional units because the satellites' signals are blocked by the building and are subject to deliberate errors that can be randomly injected during "selective availability" (SA) periods.

SUMMARY OF THE PRESENT INVENTION

It is therefore an object of the present invention to provide a system of receivers and pseudolites in a localized area for navigating equipment relative to the area especially while inside a building or outside in an area obstructed from a direct line-of-sight with the GPS satellites.

It is a further object of the present invention to provide a pseudolite with automatic updates of its own surveyed position.

It is still another object of the present invention to provide a system of receivers and pseudolites within a localized area for navigating equipment relative to the area especially while in the interiors or decks of large vessels.

It is another object of the present invention to provide a navigation receiver that provides high quality measurements on signals from both navigation satellites and fixed-location pseudolites which use separate carrier frequencies.

Briefly, an embodiment of the present invention comprises several fixed-location pseudolites that transmit coordinates of their respective positions to a local area navigation receiver. The respective relative or absolute position and range information to each pseudolite is used to compute the position of the receiver. The pseudolites transmit on frequencies exempt from licensing requirements at power levels under one watt and use spread spectrum communication and pseudo random number codes similar to the global positioning system operated by the United States Government.

An advantage of the present invention is that a local navigation system is provided that functions in the interiors of buildings, vessels or areas without disruption of service by the blockage of microwave radio transmissions from orbiting navigation system satellites.

A further advantage of the present invention is that a local navigation system is provided that functions in the interiors of buildings, vessels or areas obstructed from a direct line with GPS satellites.

Another advantage of the present invention is that a pseudolite is provided with periodic and automatic updates of its position.

A further advantage of the present invention is that a navigation receiver is provided that outputs reliable position information based on a combination of measurements from frequency-separate carrier signals respectively transmitted from both navigation satellites and fixed-location pseudolites.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
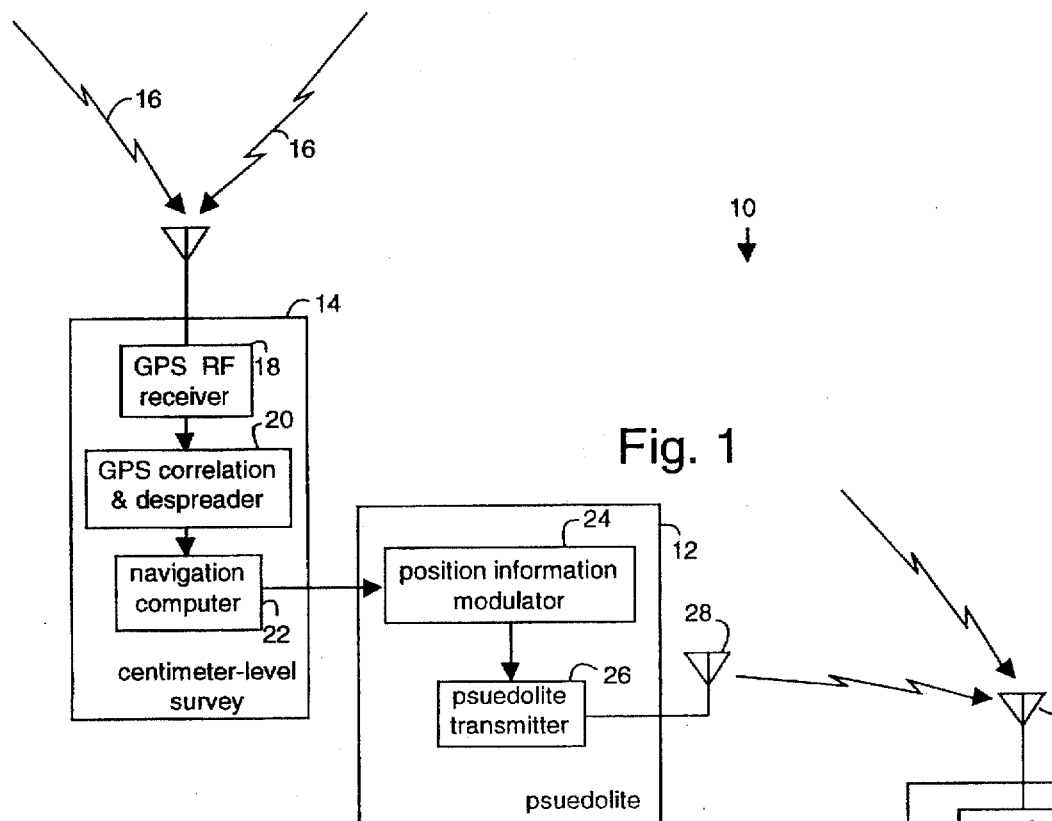
FIG. 1 is a block diagram of a local-area pseudolite navigation system embodiment of the present invention.

FIG. 1 illustrates a local-area pseudolite navigation system embodiment of the present invention, referred to by the general reference numeral 10. The system 10 comprises a pseudolite 12 that receives periodic position determinations from a conventional centimeter level survey unit 14. A plurality of fixed-frequency spread spectrum microwave radio signals 16 are received from orbiting global positioning system (GPS) satellites. A radio frequency stage 18 downconverts the signals for a GPS correlation and despreader 20. Ranging signals are then provided by the despreader 20 to a navigation computer 22. Once the navigation computer 22 has determined the correct position of survey unit 14, it can thereafter provide differential correction information. For example, a link 23 (FIG. 3) represents a connection out by either by beacon radio transmission or cable of data that can be used by navigation satellite receivers to account for local variances in the ranging and time information provided by transmissions 16. Such techniques are conventional and well-known to artisans. The survey unit 14 may be a commercially-available GPS survey system, e.g., as marketed by Trimble Navigation (Sunnyvale, Calif.).

The pseudolite 12 remains in a fixed position relative to the earth or some other predetermined reference, e.g., on a ship. A position information modulator 24 provides spread-spectrum coded information related to coordinates for the fixed position of the pseudolite 12. A transmitter 26 generates a carrier signal for output to an antenna 28 that carries the modulated position information. The pseudolite 12 emulates the function and radio transmissions of conventional GPS satellite transmitters, and provides ephemeris information reflecting the fixed position of the pseudolite.

Multipath errors can be exacerbated by operation in cavernous areas and close proximity of transmitters to receivers. The problem is described in detail and at least one implementation solution is proposed in U.S. Pat. No. 5,347,536, issued May 13, 1994, to T. Meehan, and incorporated herein by reference. In order to reduce the impact of multi-path interference on its receivers, the pseudolite 12 preferably includes provision to generate multi-path signature data.

Preferably, the transmitter 26 operates on frequencies different than those assigned for use by the GPS satellites. It is particularly advantageous to operate the transmitter 26 at 900 MHz, 2.4 GHz and 5.7 GHz and at power levels under one watt in the United States, since such operation is exempt from government licensing. Of course, other frequencies that do require government licensing are also useful in this system. Alternatively, the transmitter 26 is operated to provide infrared or laser light beams as carriers that are directed to an intended local area navigation receiver 30.

An antenna 32 receives the modulated carrier signals from at least four pseudolites 12 distributed in a geometry suitable for three-dimensional triangulation. Such carrier signals are down-converted by a carrier receiver 34 and correlated and despread by a stage 36. Ranging information to each pseudolite 12 and their reported positions are used by a local area navigation computer 38 to determine the position of the local area navigation receiver 30. A commercially-available GPS receiver may be used to implement the local area navigation receiver 30 if its radio frequency stages are modified to accept the carrier frequencies and types output by the pseudolites 12. For example, the SCOUT as marketed by Trimble Navigation (Sunnyvale, Calif.) may be used.

Multi-path errors affect the navigation receiver 30 in its ability to compute its position. The longer paths transitioned by multi-path signals cause a phase distortion in the auto-correlation function that obscures the correct carrier and code phase and defeats attempts to compute position precisely and reliably. Several United States Patents describe the problem in detail and address solutions that may be used in the implementation of the navigation receiver 30. For example, U.S. Pat. No. 5,390,124, issued Feb. 2, 1995, to C. Kyrtsos; U.S. Pat. No. 5,402,450, issued Mar. 28, 1995, to G. Lennen; U.S. Pat. No. 5,375,059, issued Dec. 20, 1994, to C. Kyrtsos, et al.; and U.S. Pat. No. 5,390,125, issued Feb. 14, 1995, to J. Sennott, et al., all of which are incorporated herein by reference.

Figure 2:
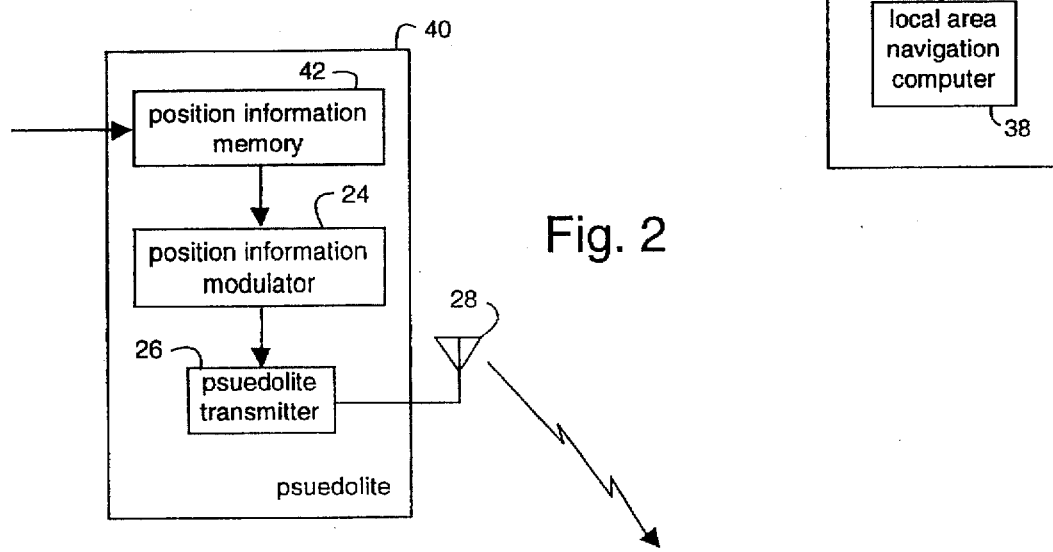
FIG. 2 is a block diagram of a pseudolite with a memory to store position coordinate information.

FIG. 2 shows a pseudolite 40 that operates without constant or periodic inputs of surveyed-positions. A memory 42 is programmed at least once with the coordinates of the actual or ultimate location of the pseudolite 40. Such coordinates may be earth coordinates, or floating coordinates relative to a building or a ship, for example. The modulator 24 and transmitter 26 are identical to those described for the pseudolite 12. However, it may be advantageous in hostile applications to make the transmitters 26 "frequency agile" with carrier frequency synthesizers to avoid enemy attempts to jam communication with the local area navigation receiver 30. In such an implementation, the carrier receiver 34 would be similarly frequency agile to track the skipping around of the carrier.

Figure 3:
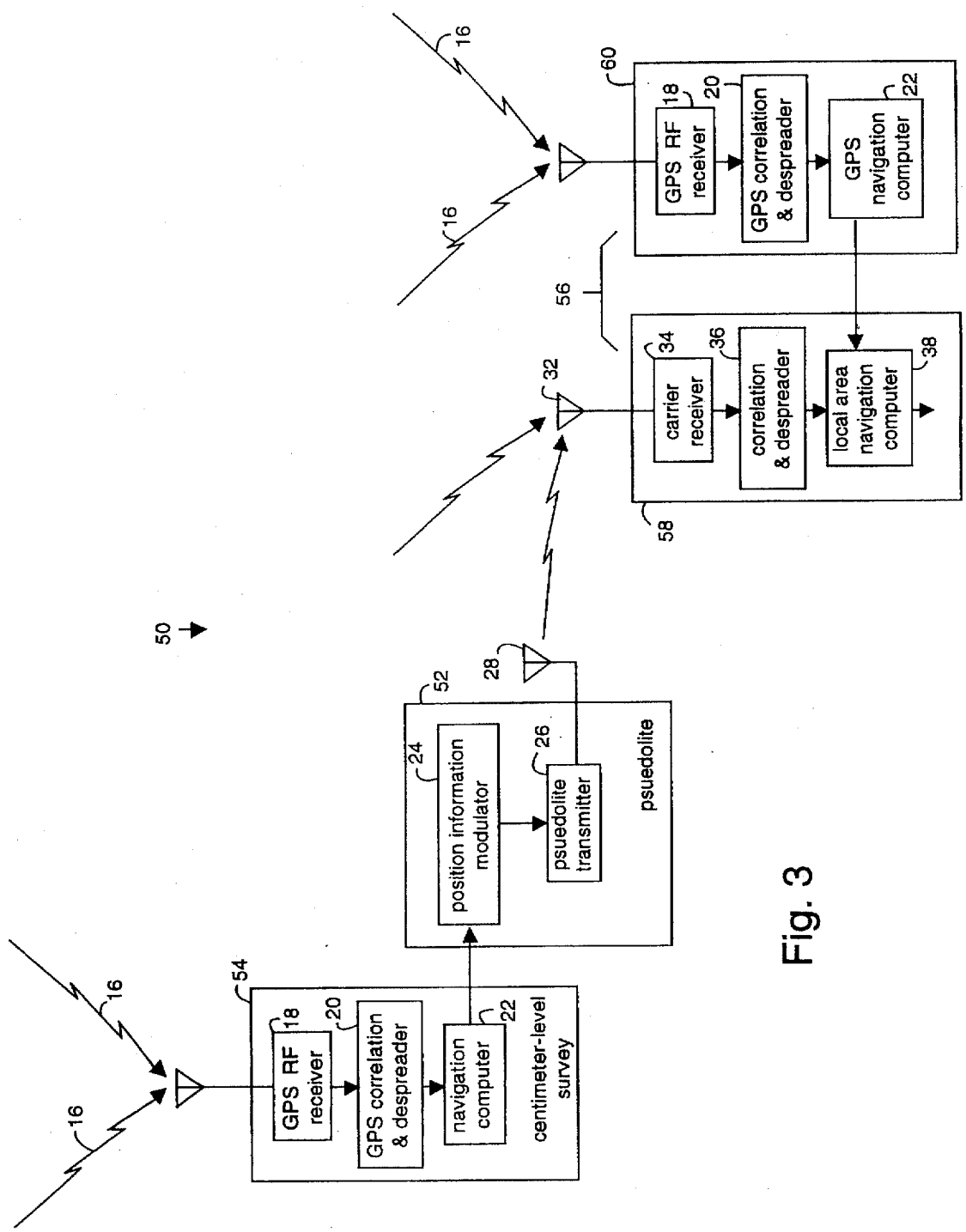
FIG. 3 is a block diagram of a hybrid GPS and local-area pseudolite navigation system embodiment of the present invention.

FIG. 3 illustrates a hybrid of GPS navigation and local area navigation. A hybrid navigation system 50 includes several pseudolites 52 and associated survey units 54 that are distributed in a local sheltered area, e.g., a garage, tunnel, building or ship interior. A mobile receiver combination 56 comprises a local area navigation receiver 58 and a conventional GPS navigation receiver 60, e.g., the SCOUT as marketed by Trimble Navigation (Sunnyvale, Calif.). As the mobile receiver combination 56 enters an area shadowed from orbiting GPS satellite transmissions, the pseudolites 52 provide all or parts of the missing elements needed in the three-dimensional triangulation computation of the position. Alternatively, a dual-frequency receiver may be implemented to receive both the transmissions of the orbiting GPS satellites and the fixed-position pseudolites 52. Such a dual-frequency receiver implementation would eliminate the duplication of the correlators and despreaders 20 and 36 and navigation computers 22 and 38.

Figure 4:
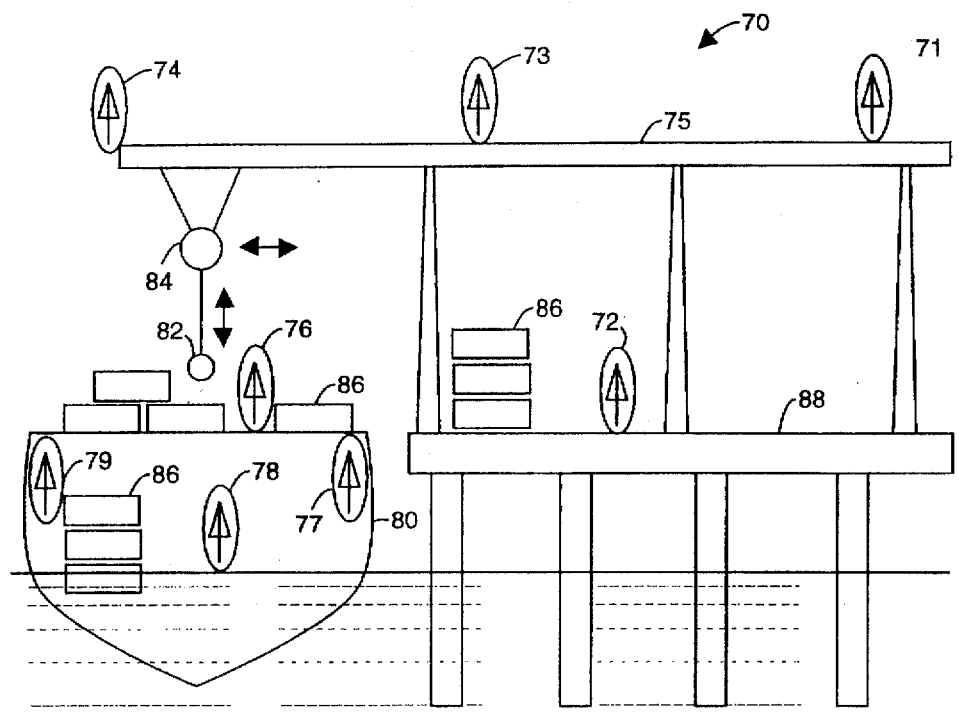
FIG. 4 is a diagram of a containerized cargo-handling system embodiment of the present invention.

FIG. 4 illustrates an embodiment of the present invention for use at a shipping dock. In FIG. 4, a containerized unloading system 70 comprises a set of earth-coordinate pseudolites 71–74 fixed to a crane 75, and a set of floating-coordinate pseudolites 76–79 fixed to a ship 80. A local area navigation receiver 82 is associated with a lift 84 that loads and unloads a number of container cargoes 86 to and from the ship 80 to a dock 88. In operation, the local area navigation receiver 82 uses transmissions from the floating-coordinate pseudolites 76–79 to navigate the lift 84 about the ship 80 and the earth-coordinate pseudolites 71–74 to navigate the lift 84 about the dock 88. Since the ship 80 is floating in water, its earth position can vary enough to comprise earth-fixed navigation provided by the earth-coordinate pseudolites 71–74. So a relative coordinate system is used that is provided by switching to receive the floating-coordinate pseudolites 76–79. The pseudolites 71–74 and 76–79 are similar to pseudolites 12 or 40 (FIGS. 1 and 2). The local area navigation receiver 82 is similar to the receiver 58 or the mobile receiver combination 56 (FIG. 3).

Figure 5:
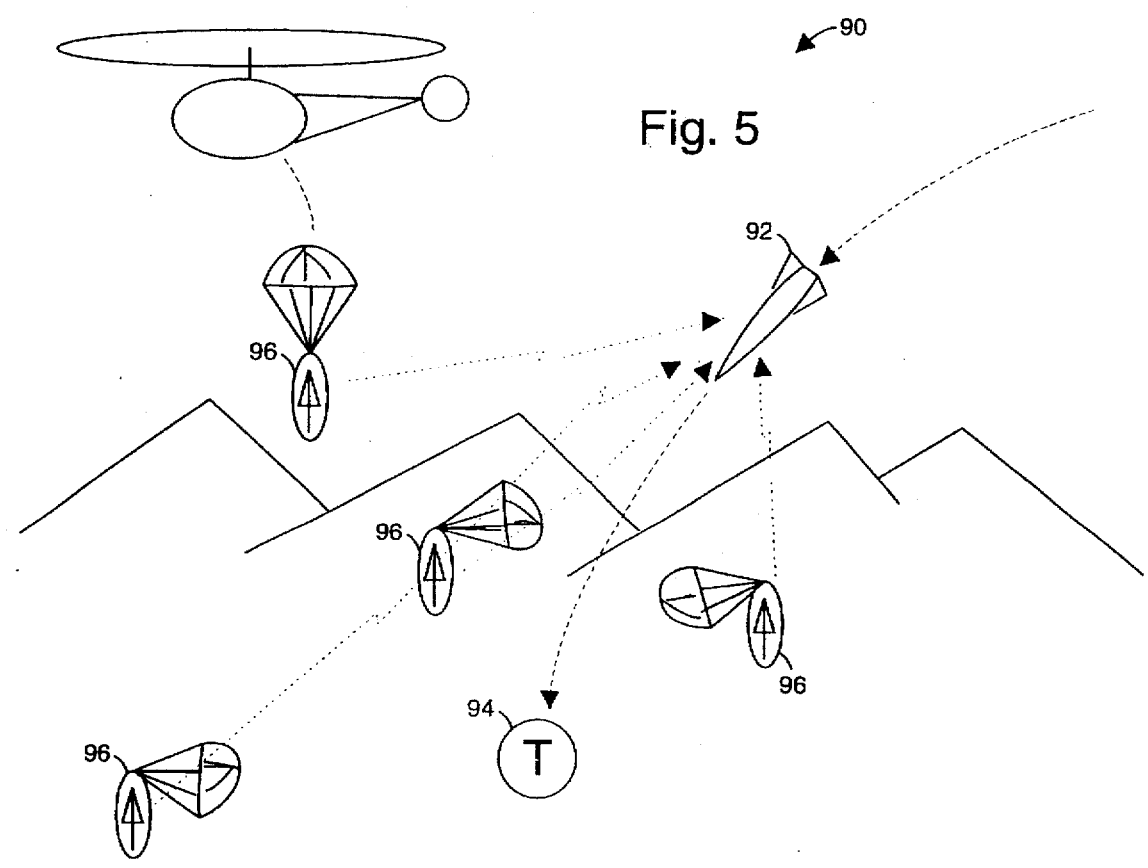
FIG. 5 is a diagram of a weapons system embodiment of the present invention for guiding smart weapons to a target.

FIG. 5 illustrates an embodiment for guiding weapons to a designated area. In FIG. 5, a weapons system 90 is used to provide guidance information to a smart-weapon 92. The position of a target 94 is known to the smart-weapon 92, either in absolute earth coordinate terms or in terms relative to some reference point established by a set of parachute-deployed pseudolites 96. The pseudolites 96 are similar to pseudolites 12 or 40 (FIGS. 1 and 2). The smart weapon carries a local area navigation receiver similar to receiver 58 or the mobile receiver combination 56 (FIG. 3).

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A local area navigation system, comprising:
   a plurality of fixed-location pseudolites with carrier transmitters for transmitting a modulated carrier signal representative of respective physical positions of each pseudolite; and a mobile navigation receiver connected to receive modulated carrier signals from a combination of orbiting navigation satellites and the plurality of fixed location pseudolites, and connected to demodulate from each said modulated carrier signal and derive range information to each to determine a position for the navigation receiver;

wherein, each of said pseudolites includes a position information modulator connected to provide spread-spectrum coded coordinate information that describes a fixed position of the pseudolite and that supplements or substitutes information obtained from said orbiting navigation satellites.

2. The system of claim 1, wherein:

each of the plurality of pseudolites includes spread-spectrum radio transmitters for transmitting said modulated carrier signals at frequencies and power levels selected to avoid particular government use regulations; and each of the plurality of pseudolites provides ephemeris information in its transmission regarding the fixed position of the pseudolite.

3. The system of claim 1, wherein:

the plurality of pseudolites includes laser transmitters for transmitting said modulated carrier signals as beams of monochromatic laser light directed at expected locations of the mobile navigation receiver.

4. The system of claim 1, wherein:

the plurality of pseudolites includes infrared transmitters that transmit said modulated carrier signals in beams of infrared light which are directed at expected locations of the receiver.

5. The system of claim 1, further comprising:

a survey unit connected to at least one pseudolite for automatically providing said pseudolite with its own position solution information.

6. The system of claim 5, wherein:

the survey unit includes global position system receiver connected to provide said position information from ranging signals received from orbiting satellite microwave transmissions.

7. The system of claim 1, wherein:

the navigation receiver includes downconversion means for the reception of microwave transmissions from orbiting GPS satellites, regional radio beacon transmissions of differential-correction data, and said modulated carrier signal transmissions from the pseudolites, and further includes navigation computer means for computing the position of the receiver from a combination of range signals received from both the pseudolites and said orbiting satellites after differential correction.

8. The system of claim 1, wherein:

the navigation receiver includes a dual-frequency downconversion for the reception of both microwave transmissions from orbiting GPS satellites on a first frequency and the reception of said modulated carrier signals from the pseudolites on a second radio frequency, and further includes navigation computer means for computing the position of the receiver from a combination of range signals received from both the pseudolites and said orbiting satellites.

9. A system for transferring cargo from a moving vessel to a stationary dock and vice versa, comprising:

a plurality of fixed-location pseudolites fixed to a stationary dock with carrier transmitters for sending out a first plurality of modulated carrier signals which represent the respective physical positions of each fixed-position pseudolite; and a plurality of relative-location pseudolites fixed to a floating vessel proximate to said dock with carrier transmitters for sending out a second plurality of modulated carrier signals which represent the respective physical positions of each relative-position pseudolite with reference to said floating vessel; and a navigation receiver for receiving individual ones of said first and second modulated carrier signals and for demodulating from each signal a range information to each pseudolite and including navigation computer means for determining the position of the receiver from a triangulation of said range information with reference to either said dock fixed to the earth or said floating ship.

10. A system for transferring items between a mobile vehicle and a station, comprising:

a plurality of fixed-location pseudolites fixed to a station with carrier transmitters for sending out a first plurality of modulated carrier signals which represent the respective physical positions of each fixed-position pseudolite; and a plurality of relative-location pseudolites fixed to a vehicle proximate to said station with carrier transmitters for sending out a second plurality of modulated carrier signals which represent the respective physical positions of each relative-position pseudolite with reference to said vehicle; and a navigation receiver for receiving individual ones of said first and second modulated carrier signals and for demodulating from each signal a range information to each pseudolite and including navigation computer means for determining the position of the receiver from a triangulation of said range information with reference to either said station fixed to the earth or said vehicle.

11. A weapons system for guiding a smart weapon to a target with a known position, comprising:

a plurality of pseudolites deployed in the vicinity of a target with a known position and including respective carrier transmitters for sending out a plurality of modulated carrier signals which represent the respective physical positions of each pseudolite; and a navigation receiver mounted aboard a smart weapon directed against said target and for receiving individual ones of said modulated carrier signals and for demodulating from each signal a range information to each pseudolite and including navigation computer means for determining the position of the receiver from a triangulation of said range information.

12. The system of claim 11, wherein:

plurality of pseudolites report their positions in terms of relative coordinates that are independent of earth coordinates and related only to said known position of said target.

* * * * *